United States Patent [19]

Fujiwara

[11] 4,132,936
[45] Jan. 2, 1979

[54] CONDENSATE DISCHARGE APPARATUS

[76] Inventor: Katsuji Fujiwara, 191, Nishitani, Hiraoka-cho, Kakogawa-shi, Hyogo-ken, Japan

[21] Appl. No.: 666,909

[22] Filed: Mar. 15, 1976

Related U.S. Application Data

[63] Continuation of Ser. No. 479,542, Jun. 14, 1974, abandoned.

[30] Foreign Application Priority Data

Jun. 20, 1973 [JP] Japan .............................. 48-073694

[51] Int. Cl.² ............................................. H02H 7/08
[52] U.S. Cl. .................................. 318/482; 200/84 R
[58] Field of Search ............... 137/392, 412; 318/482; 73/308; 200/84 R, 84 C, 52 R, DIG. 1; 317/DIG. 2, 361

[56] References Cited

U.S. PATENT DOCUMENTS

| 3,351,084 | 11/1967 | Halkiades | 73/308 |
| 3,409,750 | 11/1968 | Hathaway | 200/84 R |
| 3,743,853 | 7/1973 | Dittman et al. | 317/DIG. 2 |

Primary Examiner—Robert K. Schaefer
Assistant Examiner—M. K. Mutter
Attorney, Agent, or Firm—Toren, McGeady and Stanger

[57] ABSTRACT

An apparatus is provided for discharging from a condensate sump large amounts of condensate as well as high viscous liquid by means of an electrically driven valve which is arranged at the outlet of the condensate sump and which is controlled to open and close in response to the position of a float whose location within the condensate sump is sensed by proximity switch means connected to operate the valve.

1 Claim, 3 Drawing Figures

CONDENSATE DISCHARGE APPARATUS

This is a continuation of application Ser. No. 479,542 filed June 14, 1974 now abandoned.

BACKGROUND OF THE INVENTION

The present invention relates generally to condensate discharge apparatus and more particularly to apparatus whereby large amounts of condensate and high viscous liquid may be discharged from a sump by operation of electrically driven valve means.

In machinery utilizing compressed air or steam for its operation, means must be provided whereby condensate generated within the machinery may be discharged therefrom. Such discharge means have comprised air traps or steam traps involving valve ports which are relatively small. As a result, such apparatus is limited in that it can only discharge small amounts of condensate and such limitations give rise to significant drawbacks with regard to the discharge apparatus utilized.

Additionally, high viscous liquid such as thick oil tends to accumulate in the bottom of receiver tanks or at the ends of pipe lines utilized in such equipment. Consequently, air traps or the like which are utilized with the discharging apparatus tend to become clogged at valve ports by the high viscous liquid and the trap is thereby caused to become inoperative.

Thus, advantages will arise if the discharge apparatus can be arranged not only to increase the amount of condensate which can be discharged but also to simultaneously enable the discharge of the high viscous liquid or oil.

The present invention is intended to provide apparartus which will enable the discharge of large amounts of condensate as well as the discharge of high viscous liquids from a condensate sump.

More particularly, the invention is aimed at the provision of discharge apparatus which will operate reliably and remain operatively reliable for longer periods of time.

SUMMARY OF THE INVENTION

Briefly, the present invention may be described as apparatus for discharging condensate from a condensate sump which includes a housing provided with an inlet and an outlet and a float arranged to rise and fall within the sump in accordance with the level of condensate therein. More specifically, the discharge apparatus comprises, in combination, electrically driven valve means located at the outlet of the sump housing which is operative to control discharge of condensate therefrom, proximity switch means including sensor means located to sense the position of the float within the sump, and means for controlling operation of the valve means in response to the proximity switch means in accordance with the proximity thereto of the float sensed by the sensor means.

The sensor means is operable to effect activation of the valve means in accordance with the location of the float relative to a predetermined distance from the sensor means and a seat member is provided for the float which is arranged to prevent abutment of the float against the sensor means but which permits movement of the float at least to within the predetermined sensing distance. By virtue of the fact that the float is maintained out of direct abutment with the sensor means, the life of the apparatus is thereby extended.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
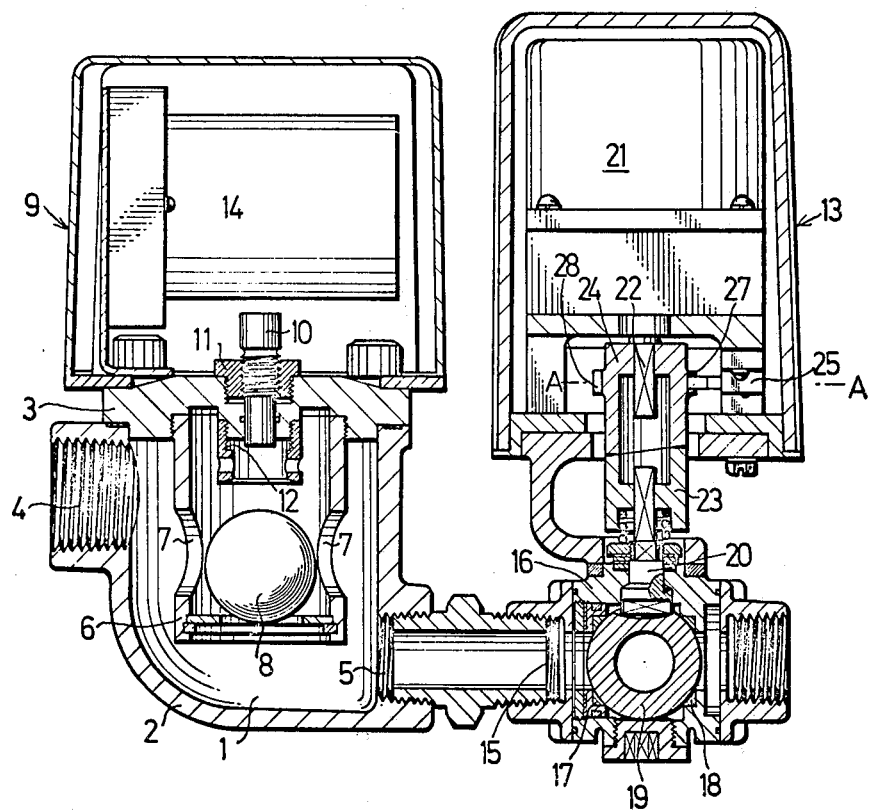
FIG. 1 is a sectional view showing a preferred embodiment of the present invention.

Referring now to FIG. 1 of the drawings which depicts an overall assembly of apparatus involving the present invention, there is shown a condensate sump 1 which is constructed to include a main body 2 with a cover member 3 being attached at the upper end of the main body 2. An inlet 4 extends through the main body 2 into the sump 1 and an outlet 5 for discharging condensate is provided on the opposite side of the sump 1.

Within the sump 1 a float guide member 6 is provided with the member 6 being attached to the cover member 3 and having therein orifices 7 which communicate the interior of the guide member 6 with a sump 1. A float 8 is freely maintained within the guide member 6 in a manner whereby the float is permitted to rise and fall in accordance with the level of condensate within the sump.

Arranged above the cover member 3 there is provided a proximity switch 9 which includes a sensor 10 positioned directly over the float 8. The sensor 10 is disposed to extend through the cover member 3 so that its lower end may project to a specific degree into the area defined below the cover member 3. The sensor 10 is secured to the cover member 3 by securing means 11 and the type of sensor which is provided is preferably such that it is not necessary for the float 8 to come into direct contact or abutment therewith in order for the sensor 10 to sense the location or presence of the float 8. Accordingly, the sensor 10 is designed such that when the float 8 rises and comes into proximity thereto within a predetermined distance therefrom, the sensor 10 will generate a signal indicating the presence of the float 8 within the predetermined distance.

Around the projecting end of the sensor 10 there is provided a float seat member 12 which is secured to the cover member 3. The seat member 12 is configured to engage the float 8 to limit its uppermost position at a point out of contact with the sensor 10 but within sufficient proximity thereto that the presence of the float 8 may be sensed by the sensor 10.

An electrically driven valve 13 is connected with its inlet in flow communication with the condensate outlet 5 thus enabling condensate from the sump 1 to flow through the outlet 5 into the valve 13. Current supply to the electrically driven valve 13 is controlled by the proximity switch 9, which in addition to the sensor 10 comprises a control unit 14 connected within the assembly by an electrical circuit (not shown) thorugh which the unit 14 is operated by the sensor 10.

The electrically driven valve 13 comprises a valve casing 16 which forms an inlet passage 15 to the valve 13 which is in communication with the outlet 5. Two valve seat members 17 and 18 are each disposed in the casing 16 and a ball-shaped valve body 19 is arranged to cooperate with both of the valve seats 17 and 18 for opening and closing the outflow passage 15. A valve stem 20 for operating valve body 19 is connected through connecting means 23 to the driving shaft 22 of a motor 21 located above the casing 16. A cam 24 is provided about the connecting means 23 and a pair of microswitches 25 and 26, best seen in FIGS. 2 and 3, are arranged to cooperate with the cam 24 to control switching of the motor on and off during its operation to open or close the valve 13.

As will be apparent from the drawing, the valve body 19 is of the type which will operate to open and close the outflow passage 15 with continuous rotation of the valve stem 20 in the same direction. Thus, the polarity of the motor 21 need not be reversed during operation of the device in order to effect opening and closing operation of the valve.

Figure 2:
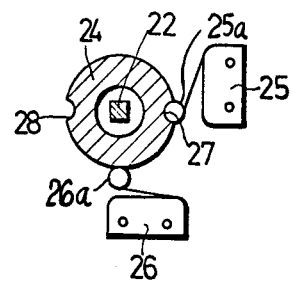
FIG. 2 is a sectional view taken along the line A-A of FIG. 1 showing a cam member and microswitches of an electrically driven valve of the apparatus of the invention.

As best seen in FIG. 2, the cam 24 is provided with a pair of recesses 27 and 28 which are arranged at the periphery of the cam 24 at positions spaced apart from each other by an angle of 180°. The microswitches 25 and 26 are arranged at positions spaced apart about the cam 24 by an angle of 90°. Each of the microswitches 25 and 26 includes, respectively, a cam follower member 25a and 26a adapted to engage the periphery of the cam 24 to engage the recesses 27 and 28 in a manner controlling the on-off operation of the switches 25 and 26.

Figure 3:
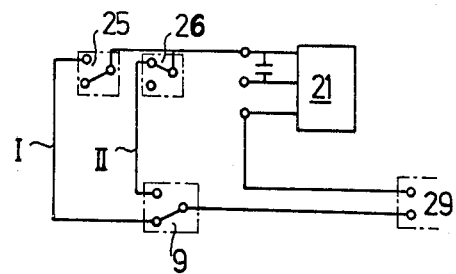
FIG. 3 is an electrical circuit diagram of circuitry utilized for controlling the discharging apparatus of the invention.

In FIG. 3 there is shown electrical circuitry depicting the manner whereby the elements of the present invention are electrically connected to effect operation of discharge apparatus of the invention. A power source 29 for driving the motor 21 is connected on one side thereof to one side of the motor 21, and on the other side thereof to the proximity switch 9 in a manner whereby said other side of power source 29 may be selectively alternatively connected to the other side of the motor 21 through either of a pair of circuits I, II. Connected in each of the circuits I and II between the proximity switch 9 and the motor 21 are the microswitches 25 and 26.

In the operation of the apparatus of the present invention during the starting phase of operation the float 8 will be at its lowest position and the electrically driven valve 13 will be in its closed condition. During operation of the apparatus, condendensate and high viscous liquid, such as thick oil, will flow into the condensate sump 1 through the inlet 4. The liquid level within the sump 1 will rise along with the inflow of liquid and the float 8 will be raised thereby.

When the float 8 rises to a point near the sensor 10 within a predetermined distance therefrom, the proximity switch 9 will be activated and will at that time switch the power source 29 into connection with the motor 21 from the circuit I to the circuit II.

At this time, the microswitch 26 will be closed by virtue of the engagement between the periphery of the cam 24 and the cam follower 26a and, accordingly, the motor will be driven into rotation to drive the valve body 19 to open the valve 13. This mode of operation will occur by means of power transmitted from the motor through the drive shaft 22 and the connecting means 23 to the valve stem 20 of the valve body 19.

When the valve body 19 reaches a position at which the valve 13 is in its open condition, the motor 21 will be stopped from further rotation by virtue of the engagement between the cam 24 and the cam follower 26a which will engage the recess 27 to switch off the microswitch 26 thereby opening the circuit II in order to cut off power supply to the motor 21. Thus, the motor 21 will be stopped with the valve 13 in its open condition.

As a result, a large amount of condensate from within the sump 1 will be discharged within a relatively short period of time through the large valve port which is provided on the valve body 19 of the electrically driven valve 13. Furthermore, even when a high viscous liquid such as thick oil accumulates in the sump 1, the liquid will not be permitted to clog the valve port since it will be easily discharged through the valve port due to its large size.

When the liquid level within the sump 1 falls after the condensate and the high viscous liquid have been discharged, the float 8 will drop away from the sensor 10 and become spaced therefrom a distance greater than the predetermined distance previously mentioned. As a result, the sensor 10 will activate the proximity switch 9 to connect the power source 29 to the motor 21 through the circuit I thereby causing the motor to rotate to drive the valve body 19 toward a position closing the valve 13. During this time, the microswitch 25 will be in the closed condition by virtue of the engagement of the cam follower 25a against the surface of the cam member 24 and when the valve body 19 reaches a point at which the valve 13 is closed, cam follower 25a will be activated to open the switch 25 thereby terminating the driving operation of the motor at the point where the valve 13 is closed.

When, subsequent to closing the valve 13, liquid in the sump 1 again rises to elevate the float 8, the mode of operation previously described for opening the valve 13 will be repeated.

It will be seen that with the sensor 10 arranged above the float 8 within the float seat member 12, the float 8 will be restricted in its upward path of travel and will not be permitted to come into contact with the sensor 10. Accordingly, any high viscous liquid which may be adhered to the float 8 will not be permitted to become deposited upon the sensor 10 so that the sensitivity of the sensor 10 will not be damaged or weakened. Furthermore, even when the float 8 rises rapidly along with rapid inflow of a large amount of liquid, the float 8 will nevertheless be prevented from striking against the sensor in a manner which could cause damage or breakage thereof. Since the float 8 is resticted with regard to its highest position by the float member 12, without impairing the operation of the sensor 10, a longer life span is imparted to the apparatus without diminishing or otherwise impairing the operative reliability thereof.

While a specific embodiment of the invention has been shown and described in detail to illustate the application of the inventive principles, it will be understood that the invention may be embodied otherwise without departing from such principles.

What is claimed is:

1. Apparatus for discharging condensate from a condensate sump comprising a housing defining said sump with an upper portion and providing an inlet and an outlet for said sump, a float arranged within said sump, said float being formed with a generally spherical configuration having a continuous unbroken outer surface and arranged in said sump in a substantially free floating state detached from any other parts of said apparatus, electrically driven valve means located at the outlet of said sump operative to control discharge of condensate therefrom, proximity switch means controlling operation of said valve means for periodically discharging condensate from said sump, sensor means located in the upper portion of said sump directly above said float for sensing the position relative thereto of said float and for actuating said proximity switch means in accordance with the proximity of said float to said sensor means, said sensor means being operative to effect activation of said valve means in accordance with the location of said float relative to a predetermined distance from said sensor means, and a seat member for said float arranged to prevent abutment of said float against said sensor means but permitting movement of said float at least to within said predetermined distance, said housing being configured to define said sump to include generally vertically upstanding inner wall means surrounding said float, said inner wall means being dimensioned to maintain a horizontal spacing between said float and said wall means to enable said float to freely move vertically therein beneath said sensor means and into abutment with said seat member in accordance with the level of condensate within said sump while maintaining said float in sufficient vertical alignment with said sensor means to enable said sensor means to effect sensing of the proximity thereto of said float, said proximity switch means operating to open and close said valve means in response to said sensor means to effect condensate discharge in accordance with the level of condensate within said sump.

* * * * *